I. S. JOSEPH.
PROCESS OF RECOVERING CRUDE OIL.
APPLICATION FILED APR. 29, 1919.
1,362,105.
Patented Dec. 14, 1920.
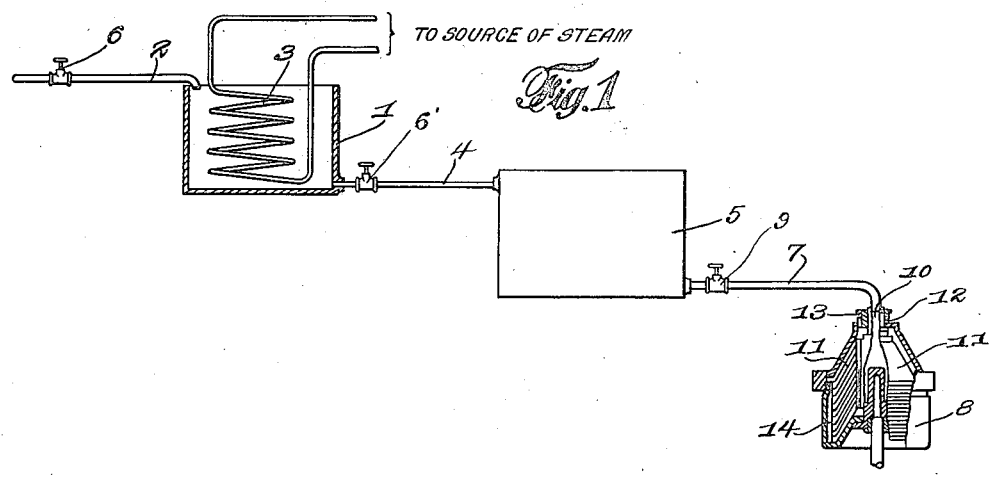
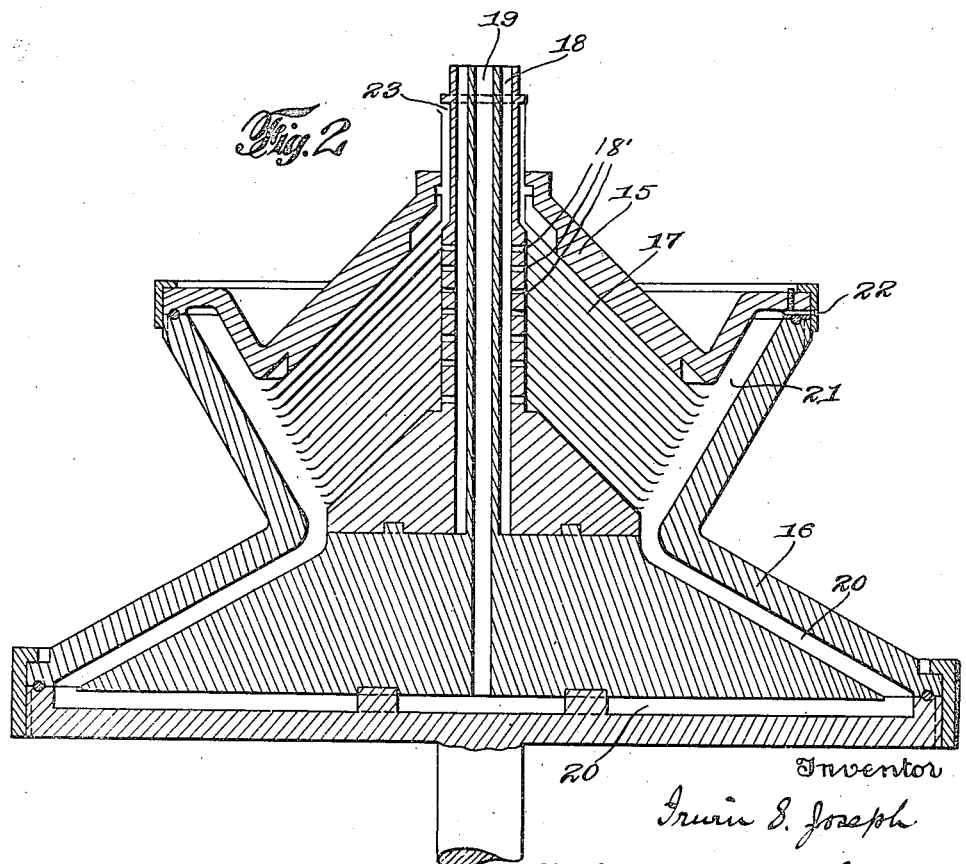

UNITED STATES PATENT OFFICE.

IRWIN S. JOSEPH, OF RAHWAY, NEW JERSEY.

PROCESS OF RECOVERING CRUDE OIL.

1,362,105.  Specification of Letters Patent.  Patented Dec. 14, 1920.

Application filed April 29, 1919. Serial No. 293,443.

*To all whom it may concern:*

Be it known that I, IRWIN S. JOSEPH, a citizen of the United States, residing at Rahway, in the county of Union and State of New Jersey, have invented certain new and useful Improvements in Processes of Recovering Crude Oil, of which the following is a specification.

My invention relates to a process for recovering crude oil from "cut oil" or from B. S. (bottom settlings or bad stock) which is a mixture found in the bottom of crude oil tanks and contains *inter alia* water, crude oil and usually also solid or semi-solid material or sediment. The mixture is practically an emulsion from which the ingredients do not readily separate by gravity.

My process comprises the subjection of "cut oil" or B. S. to centrifugal action, either, and preferably before removal of the solid matter, or after the solid matter has been wholly or in part removed.

The accompanying drawings, forming a part of this specification, illustrate diagrammatically forms of apparatus for carrying out the described process, and in which—

Figure 1 represents diagrammatically, means for heating the B. S., means for removing the sediment therefrom, and a centrifugal separator.

Fig. 2 is a sectional elevation of my special form of separating device.

In Fig. 1 is shown a tank 1, a pipe 2 having a valve 6 leading into the tank for the purpose of delivering B. S. to the tank. In the tank 1 is arranged a suitable heating coil 3, which is supplied with steam from any suitable source. The outlet pipe 4 from the tank 1 leads into a suitable apparatus 5 for removing the solid matter or sediment which the B. S. may contain. This apparatus 5 may be a simple settling tank or a filter press or a centrifugal device. In the pipe 4 is a valve 6' for the purpose of controlling the flow of the mixture through this pipe. From the apparatus 5 leads a pipe 7 provided with a valve 9 through which the mixture can be delivered into a centrifugal machine 8. The pipe 7 leads the mixture into the hollow shaft 10 of the centrifugal machine which shaft is subjected to a rapid rotation. From the shaft 10 the mixture passes out between the disks 11, to which is imparted a rapid whirling motion around a vertical axis. By the centrifugal action the mixture of B. S. is separated into its constituents and the water flows off in a continuous stream from the passage 12, and the crude oil passes off into the continuous stream from the passage 13. While I prefer to heat the mixture before subjecting it to the treatment either in the apparatus 5 or in the centrifugal, this heating is not absolutely essential though it is preferable, since it reduces the viscosity of the mixture.

I prefer to use a form of apparatus such as is shown in Fig. 2, in which provision is made for taking care of the solid or semi-solid material or sediment which may be separated out from the B. S. mixture. Because of the presence of this solid material previous forms of centrifugal separators have not been suitable for use since unless special provision is made for its removal, the sediment accumulates and in a short time chokes the machine and necessitates its stoppage for cleaning. This difficulty I overcome by providing means for introducing a liquid heavier than the crude oil constituent in such manner as to flush or float out the material which tends to deposit or adhere to the wall of the centrifugal.

The apparatus as shown in Fig. 2 consists of a bowl having an upper member 15 and a lower member 16 which are secured together in any suitable manner. Inside of the bowl are placed a series of disks 17. Inside the disks is a hollow shaft 18 having openings or slots 18' permitting the flow of liquid into the spaces between the disks. Inside of the hollow shaft 18 is another hollow shaft 19 which connects with the passage 20 at the bottom of the bowl, this passage extending out around the inner sides thereof to a point at a greater distance from the center than any other inside part of the bowl. Between the disks 17 and the inner wall of the bowl member 16 is a space 21 of considerable capacity. An outlet for the space 21 is provided at 22.

In operation the mixture is passed into the shaft 18 and a liquid preferably the same as the heavy liquid constituent of that mixture,—that is in this instance, water,—is passed continuously into the shaft 19. Because of the increased extension of the passage 20 as compared with any other interior part of the bowl, the water in this passage is forced with such velocity up through the space 21 that it flushes or floats out any material or sediment which would otherwise tend to deposit on the inner wall of the bowl 16 and carries this material off at the outlet 22, together with any associated heavy liquid constituent of the mixture. By this arrangement, the inner walls of the bowl member 16 are kept free from sediment and the apparatus will operate continuously over an indefinite period of time. In this machine the water separated from the mixture together with the water coming through the passage 20 and the sediment from space 21 pass off through the outlet 22 while the separated crude oil passes off at the outlet 23.

The special details of the centrifugal separator have not been illustrated as they are well known in the art and need not be specially described.

While I have specified water as the heavier liquid introduced through the pipe 19, other suitable liquids may be substituted therefor. Although I have shown a special form of centrifugal separator, the principle of introducing a heavier liquid for flushing purposes is obviously capable of application in other types of centrifugal separating devices. So also, the same method may be applicable to other forms of emulsions or mixtures of liquid of different specific gravities.

I claim:

1. The process of recovering crude oil from B. S. and the like which consists in subjecting the B. S. to centrifugal action under conditions causing the constituents of different gravity to move along different paths and subjecting a fluid, substantially as heavy as the heavier constituent, to centrifugal action under conditions causing the fluid to move along the path of the said heavier constituent with a velocity greater than that of the latter.

2. The process of recovering crude oil from B. S. and the like which consists in subjecting the B. S. to centrifugal action under conditions causing the constituents of different gravity to move along different paths and subjecting water to centrifugal action under conditions causing it to move along the path of the heavier constituent with a velocity greater than that of the latter.

In testimony whereof I affix my signature.

IRWIN S. JOSEPH.